United States Patent
Delatorre

(10) Patent No.: US 8,844,363 B2
(45) Date of Patent: Sep. 30, 2014

(54) PRESSURE ISOLATED FIBER OPTIC TORQUE SENSOR

(71) Applicant: Leroy C. Delatorre, Sugar Land, TX (US)

(72) Inventor: Leroy C. Delatorre, Sugar Land, TX (US)

(*) Notice: Subject to any disclaimer, the term of this patent is extended or adjusted under 35 U.S.C. 154(b) by 0 days.

(21) Appl. No.: 13/987,178

(22) Filed: Jul. 8, 2013

(65) Prior Publication Data

US 2013/0298697 A1 Nov. 14, 2013

Related U.S. Application Data

(63) Continuation of application No. 13/065,095, filed on Mar. 14, 2011, now abandoned.

(51) Int. Cl.
- *G01L 9/06* (2006.01)
- *G01L 9/00* (2006.01)
- *G01L 1/24* (2006.01)

(52) U.S. Cl.
CPC ............... *G01L 1/246* (2013.01); *G01L 9/006* (2013.01); *G01L 9/0052* (2013.01)
USPC .................................. 73/721; 73/732; 73/736

(58) Field of Classification Search
None
See application file for complete search history.

(56) References Cited

U.S. PATENT DOCUMENTS

| | | | |
|---|---|---|---|
| 3,582,212 A | 6/1971 | Hesse | |
| 4,372,173 A | 2/1983 | ErrNisse et al. | |
| 4,444,061 A * | 4/1984 | Mathias | 73/862.06 |
| 4,558,601 A | 12/1985 | Stasiek et al. | |
| 4,651,569 A | 3/1987 | Paros et al. | |
| 5,127,273 A | 7/1992 | Lew | |
| 5,207,767 A | 5/1993 | Delatorre | |
| 5,357,786 A | 10/1994 | Lung et al. | |
| 5,463,903 A | 11/1995 | Delatorre | |
| 5,481,919 A | 1/1996 | Brandt, Jr. | |
| 5,591,924 A | 1/1997 | Hilton | |
| 6,198,565 B1 * | 3/2001 | Iseki et al. | 359/224.1 |
| 6,807,871 B1 | 10/2004 | Paek | |
| 7,367,250 B2 | 5/2008 | Rainone et al. | |
| 7,605,966 B2 * | 10/2009 | Tani et al. | 359/224.1 |
| 7,775,433 B2 * | 8/2010 | Ando | 235/454 |
| 7,823,485 B2 | 11/2010 | Rainone | |
| 7,987,734 B2 * | 8/2011 | Maehara | 73/862.333 |

* cited by examiner

*Primary Examiner* — Lisa Caputo
*Assistant Examiner* — Jermaine Jenkins
(74) *Attorney, Agent, or Firm* — W. Allen Marcontell

(57) ABSTRACT

Fabry-Perot and Bragg grating optical measuring principles are combined with a torsional stress sensing mechanism that converts torque applied in one fluid environment to force exerted in a second environment to measure extreme environmental parameters such as pressure in a petroleum producing borehole.

36 Claims, 8 Drawing Sheets

PRESSURE ISOLATED FIBER OPTIC TORQUE SENSOR

CROSS-REFERENCE TO RELATED APPLICATION

The present invention claims the Mar. 15, 2010 Priority Date of U.S. Provisional Application No. 61/340,170 and the Dec. 23, 2010 Priority Date of U.S. Provisional Application No. 61/458,276. The present invention is a Continuation of application Ser. No. 13/065,095 Filed Mar. 14, 2011. Said application Ser. No. 13/065,095 is a Continuation-In-Part of U.S. Pat. No. 8,353,215 issued Jan. 15, 2013. Said U.S. Pat. No. 8,353,215, claims the Jul. 13, 2009 Priority Date of Provisional Application No. 61/270,722.

BACKGROUND OF THE INVENTION

1. Field of the Invention

This invention relates to a fiber optic type torque sensor for measuring precision values of torque generated within a pressure media such as in an oil or gas well environment. Specifically, this environment will also generally include exposure to high temperature, high pressure, corrosive media, shock and vibration. Additional requirements usually include a small diametrical size, low power consumption and the ability to make accurate measurements in the presence of all of these factors.

2. Description of Related Art

Torque is often measured by the utilization of fiber optic strain gauges in various configurations. These types of measurement techniques, however, are generally limited to values of torque that are high enough to create measurable strain levels within a shaft or torsion element. Also, these configurations would normally only lend themselves to physical configurations that preclude routing of associated optical fibers within a fluid media. These criteria are often not met when measurements are to be made in hostile environments such as below the surface, as in an oil or gas well. Additionally, torque output responses derived from physical measurements often require that the torque should be measured primarily as a force rather than as a displacement. It is an object of this invention, then, to provide a strain gauge type torque sensor, suitable for use with precision physical measurement devices which develop a torque parameter output within such hostile environments.

SUMMARY OF THE INVENTION

The present torque measurement system is comprised of a frictionless pressure isolator to couple torque from a well fluid environment into an instrument environment. A fiber optic based torque displacement, or strain, sensor allows measurement of stress that is imposed in a hostile environment from within the isolated instrument environment. The input torque is transmitted by means of a shaft, immersed within the well pressure media, to a pressure isolator tube. Torque transmitted by the pressure isolator tube is then coupled into a torque-to-displacement converter to generate a displacement, or force that is applied to a fiber optic sensor. Conversely, the torque isolator may be reversed so that the input is via the torque tube and the output is via the torque shaft. In both examples, this approach, as opposed to the more conventional measurement of shear or bending stress, allows very small values of torque, which may be present in a high pressure environment, to be accurately measured. This is also accomplished with a very low resultant input torque displacement response.

Two embodiments of the design are described. with different advantages for each. Both embodiments share common design features to allow them to reject external vibration and provide isolation from coupling to the external support housing with different advantages for each. Also, both share common design features to allow them to reject external vibration and provide isolation from coupling to the external support housing.

BRIEF DESCRIPTION OF THE DRAWINGS

The advantages and further features of the invention will be readily appreciated by those of ordinary skill in the art as the same becomes better understood by reference to the following detailed description when considered in conjunction with the accompanying drawings in which like reference characters designate like or similar elements throughout.

DESCRIPTION OF THE PREFERRED EMBODIMENTS

The fundamental measurement method conceived for this invention is to develop a torque output, within the sensor, which is representative of the measurand. The term "stress", as used herein, describes a directed force. "Strain", as used herein, describes a value of material distortion or stretching due to an applied "stress". "Torque", as used herein, describes a specialized "stress" value wherein a force is applied arcuately about an axis to produce a twisted strain.

It is also useful to recall that all materials are resilient to one degree or another. The relationship between stress (force) and strain (distortion) is a characteristic function of material property. Hence, when the operative properties of a material are known, it is possible to determine the magnitude of a stress on that material by measuring the magnitude of strain induced by the stress. In most cases, the converse of this principle is also true.

Figure 1:
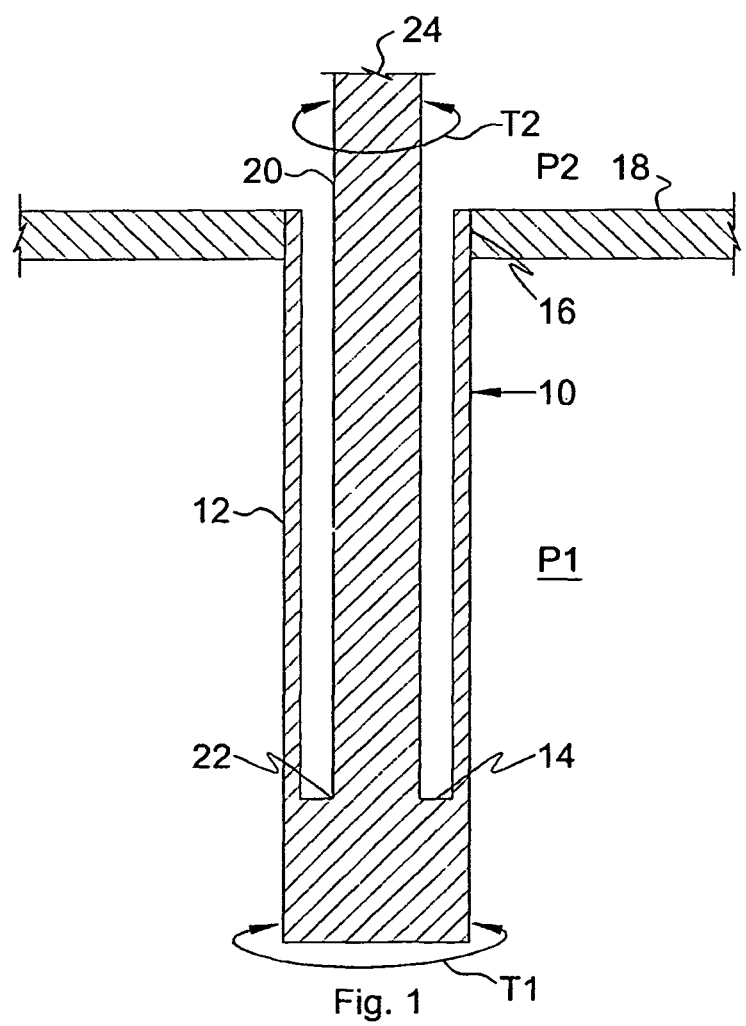
FIG. 1 is an illustration of a pressure isolation tube assembly.

Torque can be passed from the high pressure environment into an instrument environment by means of a torque-pressure isolation tube as depicted in FIG. 1. In this figure, the isolation tube 10 is simply a cylindrical tube 12 with one end closed at 14 and the other end attached at 16 to pressure vessel 18. The closed end 14 has one end 22 of a shaft 20 attached to it so that an applied torque $T_1$, less the torque required to deflect the torque tube, will then be applied to the free end 24. It is apparent that the applied torque $T_1$ (which exists within pressure environment $P_1$), will result in an output torque $T_2$ (which exists within pressure environment $P_2$) and that the input and output torques can be exchanged. Exchanging $T_1$ and $T_2$ can be used to reverse the pressure environments, $P_1$ and $P_2$.

Of course, the stress effects of a pressure difference between $P_1$ and $P_2$ will cause distortions in the pressure isolation tube 10. However, none of these distortions will cause a significant error in the torque values $T_1$ or $T_2$ as long as torsional displacements are kept small with respect to the isolation tube 10 effective length. The effect of this arrangement, then, is to allow a torque to be coupled from one pressure level to another without the friction effects of a seal, nor any of the errors associated with distortions caused by the pressure difference.

It is important to note that there will be a torque difference between torque, $T_1$, and torque, $T_2$, if any angular displacement is involved. This will occur because of the torque required to produce that displacement within the torque isolation tube, 10. If this angular displacement is kept low then the loss across the pressure isolation tube will also be low. This, then, requires a low displacement input torque sensor to be employed to make the torque measurement.

Strain gauges, as the name implies, are devices that respond to strain. Strain results from the application of a force on a body and its level is dependent on the magnitude of the applied force, as well as the material characteristics and physical dimensions of the body acted upon by the force. This force, in the case of a low level torque, is also low and will generally also result in corresponding low levels of strain. This, then, will generally result in strain gauge responses which may be small with respect to other error effects, such as temperature sensitivities or instrumentation inaccuracies. An objective, then, for measuring low level torque is to be able to increase the strain levels related to the measurement.

Conventional methods of measuring torque with strain gauges do not meet these criteria without also requiring a relatively large rotational displacement. One such approach, for example, is to mount the strain gauges on a rectangular beam which is axially subjected to the torque to be measured. If the beam is made thin then a relatively large twist is required to get significant strains. This can be largely remedied by making the beam thick but, then, relatively large levels of torque are required to produce the desired output response. The result is that this approach does not lend itself to those measurements which simultaneously require sensitivity to low torque and low displacement.

Consider the analogy of stress (force) to volts and displacement to current. Voltage may be accurately measured through a resistance if the current is very small. This would mean that the voltage drop across the resistance due to the small current should be negligible with respect to the voltage to be measured. In the same way, force may be measured accurately, even when discrepancies may be non-linear or otherwise error-prone if the force losses required to drive consequential displacements are small.

Figure 2:
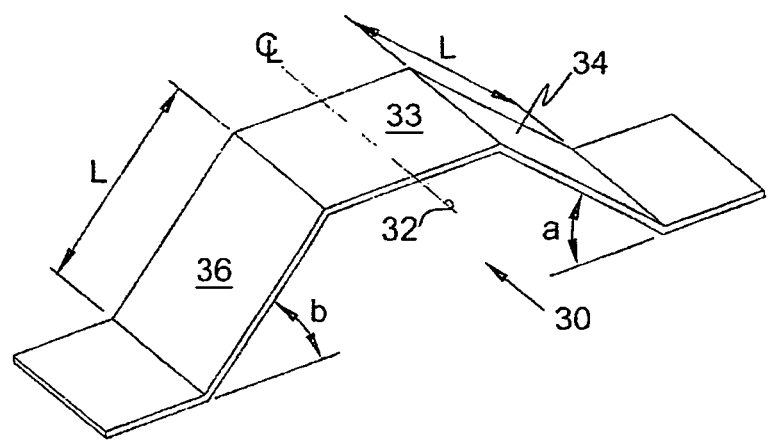
FIG. 2 is an isometric view of a force converter linkage.
Figures 3A, 3B:
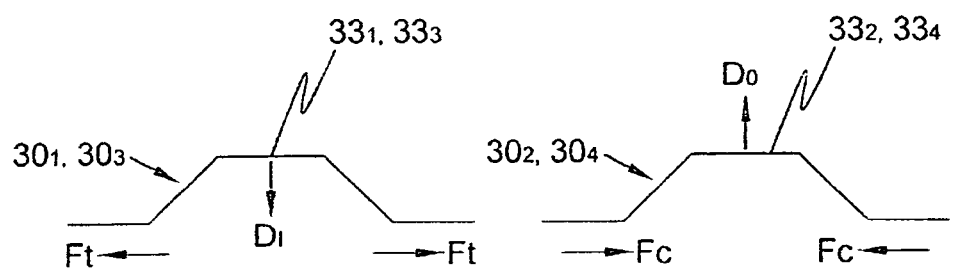
FIG. 3A is a side view of FIG. 2 with displacement conversions.
FIG. 3B is another side view of FIG. 2 with alternate displacement conversions.

FIGS. 2 and 3, illustrate a basic force converter linkage 30, used by this invention, to convert torque to a linear force or displacement D. As shown in FIG. 2, this linkage is a hat section formed symmetrically about its center line 32. This means that angles a and b formed by the junction of the flange panels and the leg panels are equal as are lengths I of leg panels 34 and 36. FIGS. 3A and 3B, illustrate that opposing forces $F_C$ or $F_t$ (or displacements) will result is a force $D_O$ or $D_I$ (or displacement) which is orthogonal to the top crown panel 33 of the force linkage 30

Figure 4:
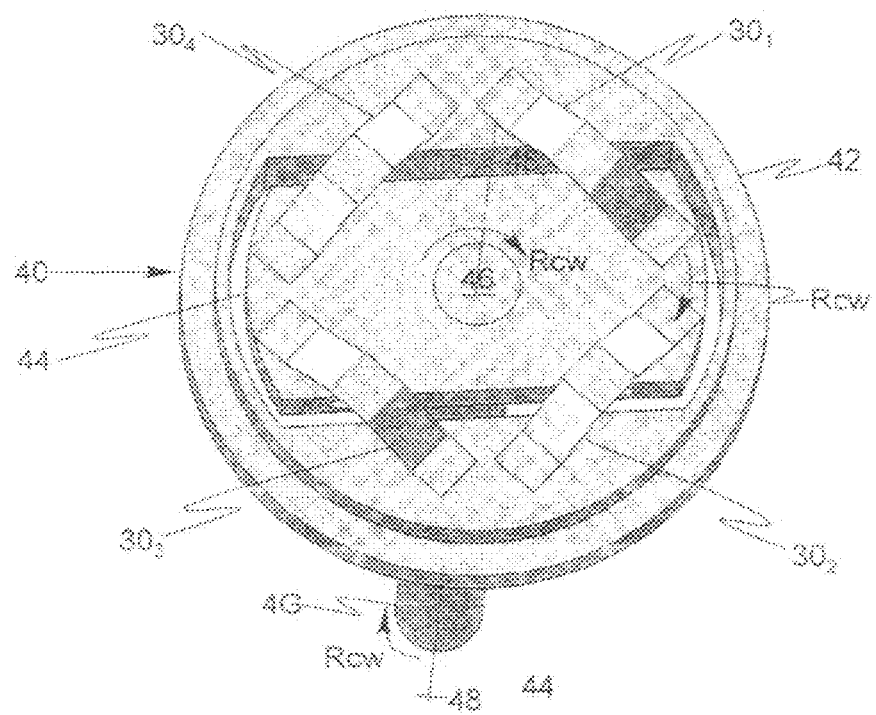
FIG. 4 is an illustration of four force linkages mounted to a torque-to-force converter.

FIG. 4, depicts a top view of four of these force linkages, $30_1$ thru $30_4$ configured as part of a torque-to-force converter 40. Each linkage 30 is attached with one flange panel mounted to a fixed plate, 42, and the other flange mounted to a central plate 44. Central plate 44 is also attached to torque input shaft 46 and is free to rotate with the shaft about axis 48. These four linkages $30_1$ through $30_4$ are normally mounted at right angles with respect to each other. It should be apparent that an applied torque on input shaft 46 will result in vertical displacements $D_O$ or $D_I$ of the respective crown panels 33 of the force linkages $30_1$ thru $30_4$ (FIGS. 2, 3A and 3B). As an example, if the input shaft 46 were to be rotated in a clockwise direction $R_{CW}$, then this would also rotate the center plate 44 in a clockwise direction $R_{CW}$. Force linkages $30_1$ and $30_3$ would both have opposing outward displacements $F_t$ applied to them as shown by FIG. 3A while linkages $30_2$ and $30_4$ would have opposing inward displacements $F_C$ applied as shown by FIG. 3B. Referring to FIG. 3A, crown panels $33_1$ and $33_3$ respective to linkages $30_1$ and $30_3$ would have a resulting downward deflection $D_I$. Also, as shown in FIG. 3B, linkages $30_2$ and $30_4$ would have their crown panels $33_2$ and $33_4$ deflected upwards, $D_O$. The difference between these deflections is proportional to the input torque displacement and this will essentially be independent of other outside factors, such as temperature.

Figure 5A:
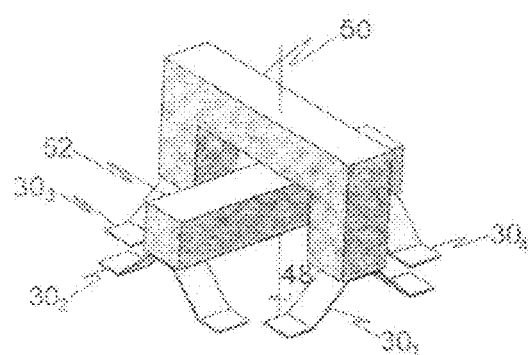
FIG. 5A illustrates the mounting of additional cross beams to the four force linkages.
Figure 5B:
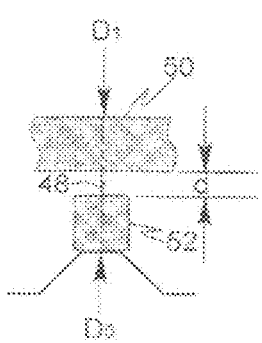
FIG. 5B illustrates how the gap between the added beams responds to an applied torque.

FIG. 5A illustrates how two beams, 50 and 52, are added and attached to the four linkages, $30_1$ thru $30_4$. Beam, 50, is attached to the tops of linkages, $30_1$ and $30_3$, while beam, 52, is mounted on top of linkages $30_2$ and $30_4$. Beam 50 is disposed to overlay beam 52 with a diametric traverse between the two in the in the vicinity of the axis 48 of torque input shaft 46. However, a normal traversal angle between the two beams 50 and 52 is not necessary. FIG. 5B shows an end view of beam 50. For the cited example of a clockwise rotation, beam, 50 would have a downward axial deflection $D_I$ while beam 52 would axially deflect in the opposite direction $D_O$. The gap, d, then, would decrease proportionally to the applied torque displacement. Of course, an increase in the gap, d, would occur for an opposite direction torque displacement. Both deflections, $D_I$ and $D_O$ are substantially parallel with the applied torque axis.

A major advantage of this arrangement is that the distance "d" of FIG. 5B is essentially independent of any small axial deflection of shaft 46, with respect to fixed plate 42 in FIG. 4. This is important because shaft 47 may be displaced by end pressure loading on the isolation tube 10 of FIG. 1 or due to thermal expansion effects. If this should occur then the effect will be to displace both beams, 50 and 52, (of FIGS. 5A and 5B) equally thereby holding the distance "d" fixed. This, of course, allows the sensor readings to reject these effects and be primarily responsive to torque alone.

Figure 6:
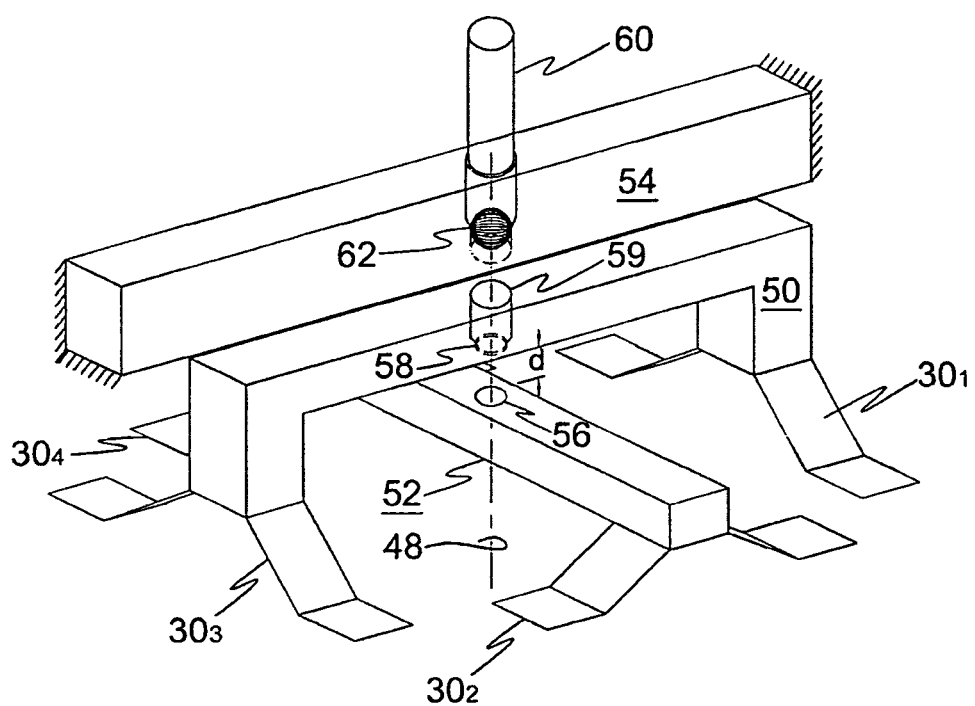
FIG. 6 illustrates an optical fiber coupled to a Fabry Perot cavity formed between the torque responsive beams to measure the differential gap.

A Fabry-Perot etalon is an interferometer instrument having two, parallel plane reflecting surfaces for optically measuring the distance between the distance between the two surfaces. Traditionally, one of the reflecting surface is a substantially fully reflecting mirror whereas the other surface is a partially reflecting dichroic. A collimated light ray is directed through said dichroic against said mirror. FIG. 6 illustrates one method for installing a Fabry Perot etalon between the two beams, 50 and 52, to measure the differential gap d between them. Basically, a reflecting surface, 56, is secured to the top of the bottom beam, 52, and a partially reflecting dichroic surface, 58, is installed on beam, 50, facing surface 56. Both surfaces are normally traversed by the central axis 48 which is also the applied torque axis. Beam, 50, also has a transverse aperture 59 to allow the passage of a collimated light ray from an optical fiber 60 mounted above it. The fiber is mounted into a secure beam 54 with a ball lens 62 between it and the first reflecting surface 56 The purpose of the ball lens is to collimate the light ray from the optical fiber before reaching the Fabry Perot dichroic lens. The measured gap d differential value may be calibrated by appropriate instrumentation to the input torque value.

This structure offers many advantages. First, the optical fiber can be mounted and maintained essentially straight with the central axis of the sensor. This eliminates any bending issues of the fiber. Secondly, the Fabry-Perot interferometer measures displacement of the sensor elements in a direction parallel with the torque axis on a non-contact basis without any resulting resistance back to the sensor. This feature provides the ability to size the mechanical components to measure very low torque levels. Next, the combination of the pressure isolation torque tube 10 and the torque to force assembly has the ability to reject vibration and temperature effects. Lastly, the complete sensor makes it possible to accurately measure small values of torque created within a pressurized well fluid environment. These environments generally comprise corrosive well bore fluids which may be pressured from atmospheric to very high values, such as 20,000 pounds per square inch. If a well is under extreme high pressure, then this may cause a significant axial strain of the pressure isolator tube and this will also be rejected by the differential output arrangement.

It should be apparent that other types of optical sensors may be substituted for the Fabry-Perot interferometer. These, however, will generally require a stress stimulus and therefore present a force load on the torque-to-force converter. These devices also generally will require either a dark termination or an output optical fiber. Meeting either of these requirements will significantly complicate their application. It should also be apparent that it is possible to introduce a second Fabry-Perot etalon into the optical fiber 60 of FIG. 6, for the purpose of measuring the sensor ambient temperature. This would allow temperature compensation of the torque sensor.

Figure 7:
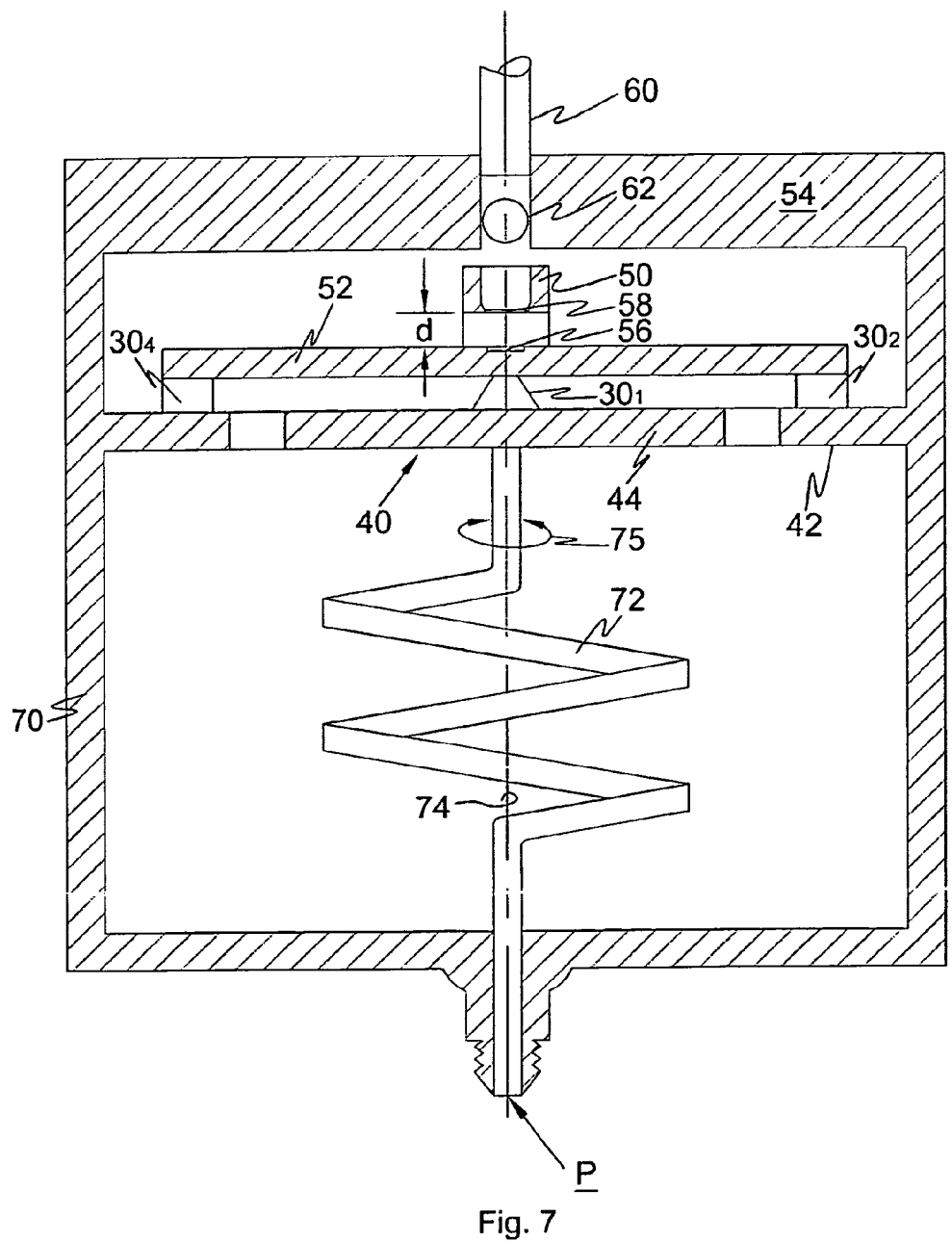
FIG. 7 is an illustration of the torque sensor with external pressure on the pressure isolator tube.

FIG. 7 illustrates a special case of this sensor. Basically, the isolation torque tube 10 of FIG. 1 has been replaced by a Bourdon tube 72. This is a special Bourdon tube in that it is configured to be symmetrical about its central axis 74 and therefore has a pure torque output response 75. This torque response 75 is coupled to a torque-to-displacement converter 40 constructed exactly as previously described with respect to FIG. 4. This will result in a differential displacement gap d modulation for the Fabry-Perot etalon and an optical response via optical fiber 60. This sensor configuration, then will provide the ability to optically measure an input pressure P with high accuracy and good rejection of temperature and vibration effects.

Figure 8A:
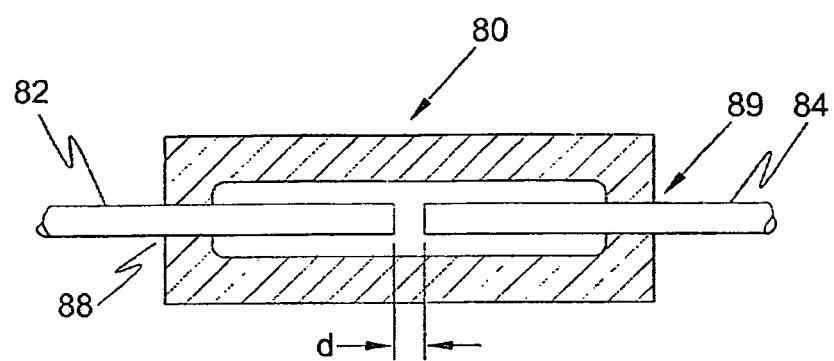
FIG. 8A illustrates two optical fibers mounted within a capillary tube and configured to form a Fabry Perot cavity type load cell.
Figure 8B:
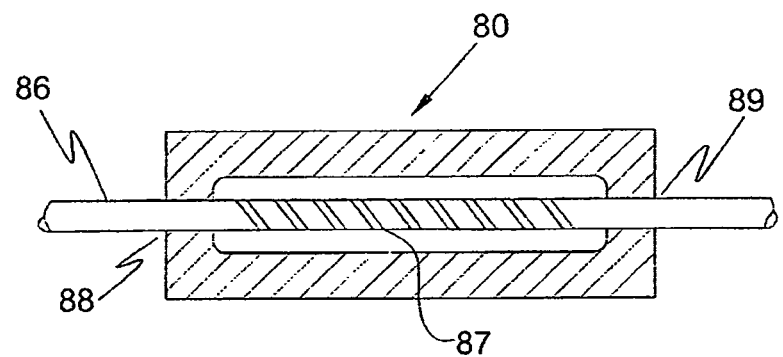
FIG. 8B illustrates a single fiber, with a Bragg grating written into it, mounted within a capillary tube to form a load cell.

FIG. 8A illustrates another fiber optic embodiment of this invention for a Fabry-Perot gap "d" and in FIG. 8b for a Bragg grating type fiber optic embodiment. Sensing element 80 in both figures are fused silica capillary tubes, which are commercially available with a precision bore to match the outer diameter of standard optical fibers 82 and 83 (FIG. 8A) or 86 (FIG. 8B). A standard fiber diameter is 125 uM (micrometers) and a capillary is available with a bore of 130 uM. This gives the fiber a 5 uM (approximately 200 micro inches) clearance within the tube.

FIGS. 8A and 8B also show that the fibers are bonded at each end 88 and 89 of the capillary tube 80. This bonding can be a thermal fusion as performed by a laser. If a capillary tube with 650 uM outside diameter is used then the end result of FIGS. 8A and 8B will be a miniature fused silica capsule which will perfectly match the fused silica fiber material and which is large in diameter with respect to that of the fiber. The capillary bore is small enough to prevent buckling of the fiber for compressive loads and the outside diameter is large enough to be stable against buckling for the lengths required for both of these approaches. These lengths would typically be about 7.5 mm for the Fabry Perot sensor of FIG. 8A and 15 mm for the Bragg grating sensor of FIG. 8B. The Fabry Perot gap "d" shown in FIG. 8A is formed when the independent fibers 82 and 83 are axially aligned and bonded into place with a gap "d" end separation. However, Bragg grating 87 is written into the fiber 86 of FIG. 8B prior to being bonded into place.

Figure 9:
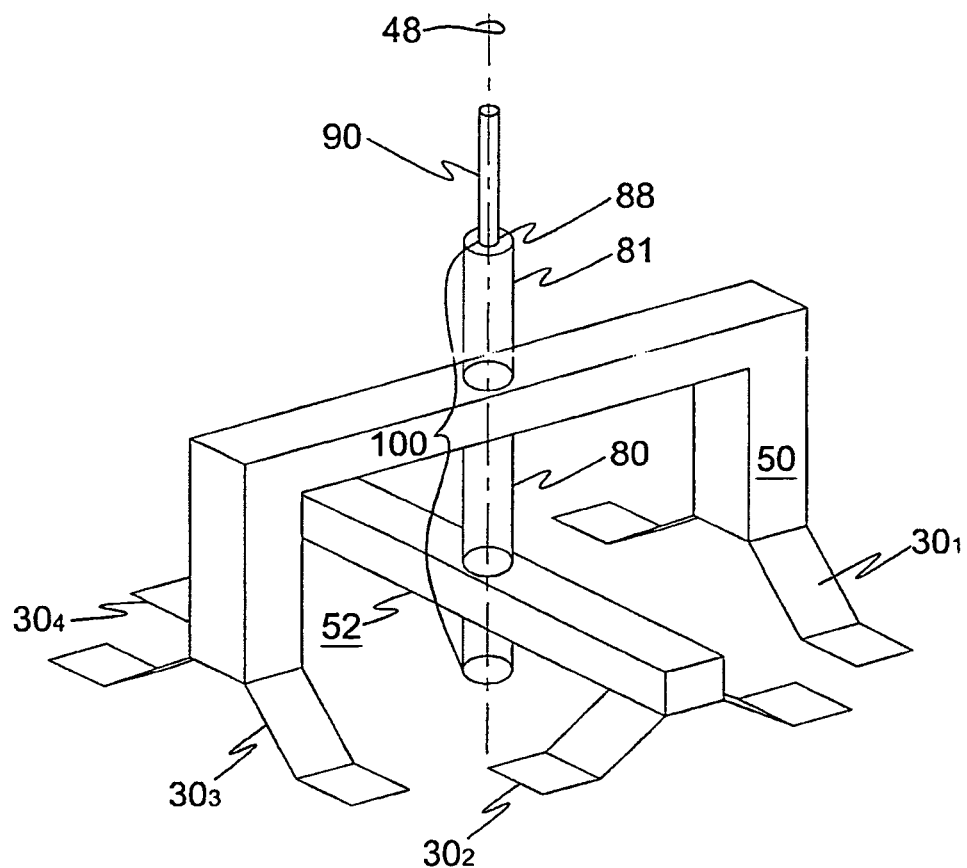
FIG. 9 is an illustration of the principle of the torque sensor.

FIG. 9 illustrates a basic principle common to all of the presently described embodiments of the torque sensor. This principle is based on installing a sensing element 80 between beams 50 and 52 and which spans the gap between them. The illustration of FIG. 9 is for the fiber optic load cells of FIGS. 8A and 8B. This is shown by FIG. 9 as item 80 within the active sensing span 100 between beams 50 and 52. The active area of each capillary load cell 80 is the area between the end bonds 88 of FIGS. 8A and 8B. Each end 81 of the capillary load cell can be extended, as required, beyond the end bond to facilitate mounting.

The effects of temperature expansion can be largely avoided by constructing the beams 50 and 52 of a material with a suitable temperature coefficient of expansion, such as invar. In the event that Bragg gratings are used then a second Bragg grating can be written into the fiber at point 90. This Bragg grating will not be stressed and therefore its response can be used to measure for temperature correction.

An important issue with respect to the application of Bragg gratings is that they generally do not work well in tension due to micro cracking within the fiber. This effect can be overcome by simply configuring the sensor to always operate in the compression mode, either by limiting the torque to always be on one side of zero or by installing the capillary load cell 23 with a compression bias.

A major advantage of the capillary type load cells 80 is that they convert the force between the beams 50 and 52 to a micro-displacement which is suitable for application with this torque tube/force converter approach. They also act as matching devices to provide a perfectly elastic element to couple to the micro-displacement characteristics of the optical fibers.

Figure 10:
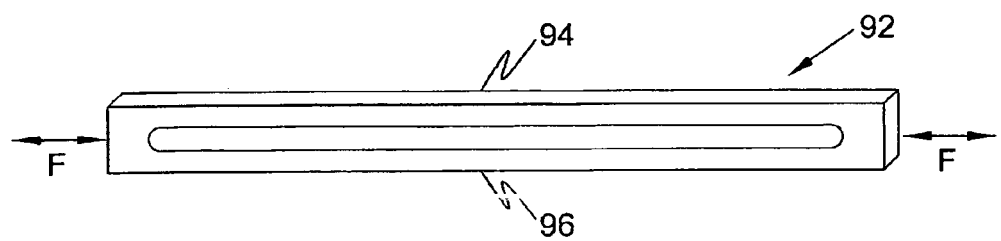
FIG. 10 illustrates a mechanical resonator.

The embodiments of FIGS. 4-7 and FIGS. 8-10 use the Fabry Perot and Bragg grating principles, respectively, as sensors. Another invention embodiment represented by FIG. 10 comprises replacing the fiber optic element 80 of FIG. 9 with a resonating beam 92. This can be a Piezoelectric or mechanical type, such as shown in FIG. 10 and as described in U.S. Pat. No. 4,372,173. The resonator 92 of FIG. 10 comprises two beams 94 and 96 joined at their ends. The beams are caused to vibrate by piezoelectric means and their frequency will be a function of an end applied force, F. Such a resonator 92 can also be constructed with a single beam and both types are similar in operation to a vibrating string except that the beam construction will work for compressive as well as tensile forces.

In all of these invention embodiments, the sensing elements installed between the beams exhibit a very small deflection for an applied force. This characteristic allows the overall response of the torque sensor to be primarily a torque force measurement device as opposed to a torque displacement measurement type and this conforms to the original stated objective of this invention.

Figure 11:
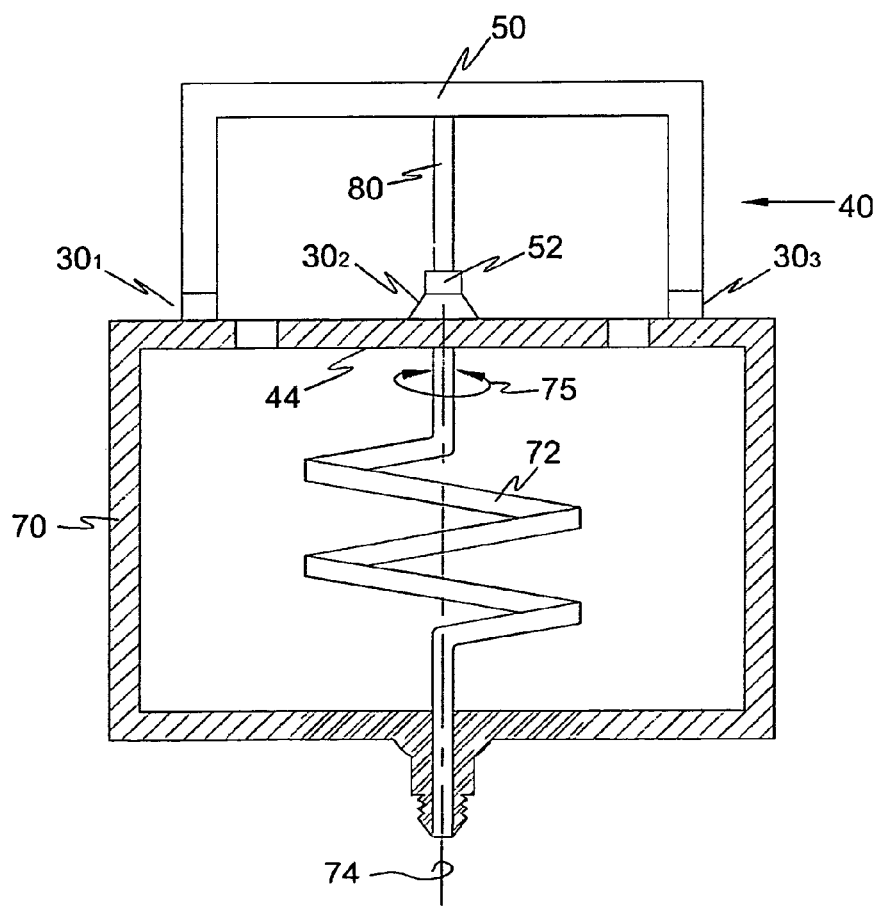
FIG. 11 illustrates a another embodiment of the invention.

An additional invention embodiment is shown by FIG. 11 and illustrates a special case of this sensor. Basically, in a manner similar to U.S. Pat. No. 5,207,767, the isolation torque tube 10 of FIG. 1 has been replaced by a Bourdon tube 72. This is a special Bourdon tube in that it is configured to be symmetrical about its central axis 74 and, therefore, has a pure torque output response. This torque response 75 is coupled to a torque-to-displacement converter 40 constructed substantially as previously described. Hence, a force sensing element 80 is attached between beams 50 and 52 in the same way as outlined for FIG. 7. This structure results in a direct conversion of pressure to torque with relatively low stresses within the Bourdon tube because of the low torque displacement sensitivity of the torque sensor assembly 40.

Although the invention disclosed herein has been described in terms of specified and presently preferred embodiments which are set forth in detail, it should be understood that this is by illustration only and that the invention is not necessarily limited thereto. Alternative embodiments and operating techniques will become apparent to those of ordinary skill in the art in view of the present disclosure. Accordingly, modifications of the invention are contemplated which may be made without departing from the spirit of the claimed invention.

The invention claimed is:

1. A torque measuring instrument comprising:
   torque transfer means for transmitting torsional force about a torque axis;
   first support means secured to said torque transfer means for angular displacement about said axis by transmitted torque;
   second support means adjacent to said first support means;
   first linkage means between said first and second support means having a first displacement segment that translates in a first direction parallel with said axis upon angular displacement of said first support means relative to said second support means;
   second linkage means between said first and second support means having a second displacement segment that translates in a second direction substantially parallel with said axis upon angular displacement of said first support means, said second direction being substantially opposite of said first direction;
   first sensor support means secured to said first displacement segment;
   second sensor support means secured to said second displacement segment;
   sensor means disposed between said first and second sensor support means to detect spatial displacements between said first and second sensor supports substantially parallel with said axis;
   means for determining a value of said spatial displacement, and,
   means for relating the value of said spatial displacement to the value of transmitted torque.

2. A torque measuring instrument as described by claim 1 wherein a value of said spatial displacement is determined by optical means.

3. A torque measuring instrument as described by claim 2 wherein said means for determining a value of said displacement comprises a Fabry-Perot etalon.

4. A torque measuring instrument as described by claim 1 wherein said means for determining a value of said displacement comprises a capillary tube load cell.

5. A torque measuring instrument as described by claim 4 wherein optical fiber is fused to opposite ends of said capillary tube.

6. A torque measuring instrument as described by claim 1 wherein said means for determining the value of said displacement comprises a pair of light reflective surfaces, one is which is a partially reflective dichroic.

7. A torque measuring instrument as described by claim 1 wherein said torque transfer-means comprises a Bourdon tube spiraled about said axis.

8. A torque measuring instrument as described by claim 7 wherein a fluid pressure within said Bourdon tube is converted to angular displacement of said first support means said torsional strain being corresponded to a value of said fluid pressure.

9. A torque measuring instrument comprising:
   means for converting a torsional strain about an axis to a spatial displacement substantially parallel with said axis comprising a first element that is angularly displaced in a first fluid environment by torsional stress imposed in a second fluid environment, said first element displacement being relative to a stationary second element positioned within said first fluid environment; at least two pairs of hat-section links, each link having a crown panel supported by a pair of substantially equal length leg panels, a distal end of one leg panel respective to each link being secured to said first element and a distal end of the other leg panel respective to said link being secured to said second element; at least a pair of transversely crossing beam elements supported at substantially opposite distal ends by the crown panels of respective link pairs whereby angular displacement of said first element relative to said second element causes spatial displacement of said pair of crossing beam elements in respectively opposite axial directions
   means for determining a value of said spatial displacement between said beam elements; and
   means for relating the value of said spatial displacement to a value of said strain.

10. A torque measuring instrument as described by claim 9 wherein a value of said spatial displacement is determined by optical means.

11. A torque measuring instrument as described by claim 10 wherein said means for determining a value of said displacement comprises a Fabry-Perot etalon.

12. A torque measuring instrument as described by claim 9 wherein said means for determining a value of said displacement comprises a capillary tube load cell.

13. A torque measuring instrument as described by claim 12 wherein optical fiber is fused to opposite ends of said capillary tube.

14. A torque measuring instrument as described by claim 9 wherein said means for determining the value of said displacement comprises a pair of light reflective surfaces, one is which is a partially reflective dichroic.

15. A torque measuring instrument as described by claim 9 wherein said means for converting torsional strain comprises a Bourdon tube spiraled about said axis.

16. A torque measuring instrument as described by claim 15 wherein a fluid pressure within said Bourdon tube is converted to said torsional strain, said torsional strain being corresponded to a value of said fluid pressure.

17. A method of measuring a torsional force comprising the steps of:
converting a torsional force about a torsion axis to a relative angular displacement between a pair of platforms about said axis;
linking a pair of sensor supports to said platforms by respective linkage pairs;
translating by said linkage pairs to respective sensor supports said angular displacement between said platforms to a relative spatial translation between said sensor supports in opposite directions substantially parallel with said axis;
measuring a relative translation distance between said sensor supports; and
correlating said translation distance to a value of said torsional force.

18. A method of measuring a torsional force as described by claim 17 comprising the step of optically determining the value of said translation distance.

19. A method of measuring torque as described by claim 18 wherein a Fabry-Perot etalon optically determines the value of said translation distance.

20. A method of measuring a torsional force as described by claim 18 wherein a Bragg grating written onto an optical fiber is used to optically determine the value of said displacement.

21. A method of measuring a torsional force as described by claim 17 comprising the step of determining the value of said translation distance by a evaluating a frequency change in a resonating beam that is distorted by said translation distance.

22. A method of measuring a torsional force as described by claim 17 wherein said spatial displacement is transferred to a capillary tube load cell for determination of said displacement value.

23. A method of measuring as described by claim 17 wherein said torsional force is induced by fluid pressure into a Bourdon tube wound about said axis.

24. A torque measuring instrument comprising means for converting torsional strain about an axis to a spatial displacement substantially parallel with said axis wherein a first element is angularly displaced in a first fluid environment by torsional stress imposed in a second fluid environment, said first element displacement being relative to a stationary second element positioned within said first fluid environment; a plurality of hat-section links, each having a crown panel supported by a pair of substantially equal length leg panels, a distal end of one leg panel respective to each pair being secured to said first element and a distal end of the other leg panel respective to said pair being secured to second element whereby the crown panels of respective pairs of links are displaced in opposite spatial directions parallel with said axis; at least a pair of beam elements secured to said respective pairs of link crown panels, said pair of beam elements supporting spatial measurement means for determining separation distance changes between said beams parallel with said axis; and calibration means for relating said separation changes to torsional strain imposed about said axis.

25. A torque measuring instrument as described by claim 24 wherein a first of said beam elements overlies a second of said pair proximate of said axis with a spatial separation distance there between.

26. A torque measuring instrument as described by claim 24 wherein said calibration means determines a value of said separation changes.

27. A torque measuring instrument as described by claim 24 comprising optical means for determining a change in said spatial separation distance between said beams.

28. A torque measuring instrument as described by claim 27 wherein said optical means comprises a substantially reflecting first surface being disposed on said first beam and a dichroic second surface disposed on said second beam, both of said surfaces being normally traversed by said axis.

29. A torque measuring instrument as described by claim 24 wherein said spatial measurement means comprises a collimated fiber optic light ray is directed along said axis, through said second surface and reflected from said first surface.

30. A torque measuring instrument as described by claim 24 wherein said means for determining a change in said separation distance between said beams comprises a capillary tube load cell disposed between said beams.

31. A torque measuring instrument as described by claim 30 wherein optical fiber is fused to opposite ends of said capillary tube.

32. A torque measuring instrument as described by claim 31 wherein independent fibers are axially aligned and fused to said capillary tube ends with an end separation distance between respective fiber ends.

33. A torque measuring instrument as described by claim 24 wherein said means for converting torsional strain comprises a Bourdon tube spiraled about said axis.

34. A torque measuring instrument as described by claim 33 wherein a fluid pressure within said Bourdon tube is converted to said torsional strain, said torsional strain being corresponded to a value of said fluid pressure.

35. A torque measuring instrument as described by claim 26 wherein said calibration means for determining a value of said separation changes comprises a Bragg grating optical fiber.

36. A torque measuring instrument as described by claim 26 wherein said calibration means for determining a value of said separation changes comprises a resonating beam.

* * * * *